(12) United States Patent
Nakao

(10) Patent No.: US 9,178,367 B2
(45) Date of Patent: Nov. 3, 2015

(54) BALANCE CORRECTION APPARATUS AND ELECTRIC STORAGE SYSTEM

(71) Applicant: EVTD Inc., Tokyo (JP)

(72) Inventor: Fumiaki Nakao, Shizuoka (JP)

(73) Assignee: EVTD Inc., Tokyo (JP)

( * ) Notice: Subject to any disclaimer, the term of this patent is extended or adjusted under 35 U.S.C. 154(b) by 0 days.

(21) Appl. No.: 14/488,253

(22) Filed: Sep. 16, 2014

(65) Prior Publication Data

US 2015/0002084 A1 Jan. 1, 2015

Related U.S. Application Data

(63) Continuation of application No. PCT/JP2013/000653, filed on Feb. 6, 2013.

(30) Foreign Application Priority Data

Mar. 19, 2012 (JP) .................................. 2012-062647

(51) Int. Cl.
*H02J 7/00* (2006.01)
*H01M 10/44* (2006.01)
*H01M 10/42* (2006.01)

(52) U.S. Cl.
CPC ............. *H02J 7/0014* (2013.01); *H01M 10/44* (2013.01); *H02J 7/007* (2013.01); *H02J 7/0016* (2013.01); *H02J 7/0026* (2013.01); *H01M 2010/4271* (2013.01); *H01M 2010/4278* (2013.01); *Y02T 10/7055* (2013.01)

(58) Field of Classification Search
CPC ...................................................... H02J 7/0014
USPC .................................. 320/103, 116, 118, 119
See application file for complete search history.

(56) References Cited

U.S. PATENT DOCUMENTS

| | | | | |
|---|---|---|---|---|
| 5,631,534 | A * | 5/1997 | Lewis | 320/103 |
| 8,493,028 | B2 * | 7/2013 | Sutardja | 320/118 |
| 9,059,588 | B2 * | 6/2015 | Nakao | 1/1 |
| 2014/0009116 | A1 | 1/2014 | Nakao | |
| 2014/0015475 | A1 * | 1/2014 | Nakao | 320/103 |

FOREIGN PATENT DOCUMENTS

| | | |
|---|---|---|
| JP | 2006-067742 A | 3/2006 |
| JP | 2008-017605 A | 1/2008 |
| JP | 2009-232660 A | 10/2009 |

OTHER PUBLICATIONS

International Preliminary Search Report for International Patent Application No. PCT/JP2013/000653, issued by the International Bureau of WIPO on Oct. 2, 2014.

* cited by examiner

*Primary Examiner* — Richard V Muralidar

(57) ABSTRACT

Excess voltage is prevented from flowing through an electric storage cell. Included are an inductor, a first switching device, a second switching device and a control section supplying a control signal to control ON/OFF operations of the first switching device and the second switching device, to the first switching device and the second switching device, where the control section supplies the control signal so that the first switching device and the second switching device repeat ON/OFF operations alternately when a voltage of the first electric storage cell and a voltage of the second electric storage cell are lower than a predetermined value, and the control section supplies a control signal to stop the balance correction apparatus, when at least one of the voltage of the first electric storage cell and the voltage of the second electric storage cell is equal to the predetermined value or larger than the predetermined value.

10 Claims, 3 Drawing Sheets

BALANCE CORRECTION APPARATUS AND ELECTRIC STORAGE SYSTEM

CROSS REFERENCE TO RELATED APPLICATION

The contents of the following Japanese patent application and PCT patent application are incorporated herein by reference: NO. 2012-062647 filed on Mar. 19, 2012, and NO. PCT/JP2013/000653 filed on Feb. 6, 2013.

BACKGROUND

1. Technical Field

The present invention relates to a balance correction apparatus and an electric storage system.

2. Related Art

Many electric storage cells connected in series may be used. In that case, when there is variation caused between voltage of these electric storage cells, the capacity of the electric storage cells cannot be effectively made use of to result in reduction in the availability of electricity amount. So as to tackle with this problem, a balance correction circuit that includes an inductor, a switching device, and a driving circuit for the switching device has been proposed to equalize the voltage of electric storage cells (Please refer to Patent Documents No. 1-No. 3).

PATENT CITATIONS

Patent Document 1: Japanese Patent Application Publication No. 2006-067742
Patent Document 2: Japanese Patent Application Publication No. 2008-017605
Patent Document 3: Japanese Patent Application Publication No. 2009-232660

SUMMARY

In the mentioned balance correction circuit, prevention of excess voltage to the electric storage cells is desired even when there is abnormality caused in control of the driving circuit. Therefore, it is an object of an aspect of the innovations herein to provide a balance correction apparatus and an electric storage system, which are capable of overcoming the above drawbacks accompanying the related art. The above and other objects can be achieved by combinations described in the claims.

DESCRIPTION OF EXEMPLARY EMBODIMENTS

Figure 1:
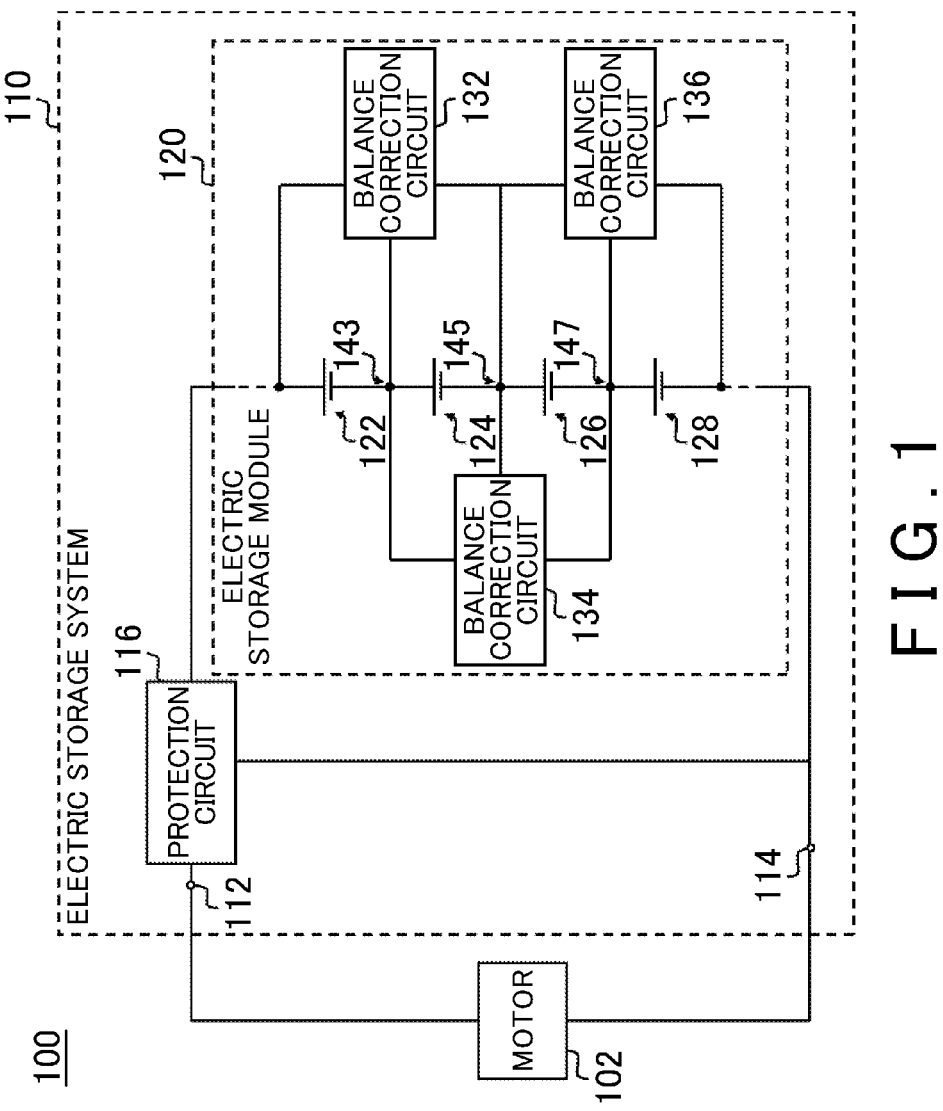
FIG. 1 schematically shows an example of an apparatus 100 including an electric storage system 110.

Hereinafter, some embodiments of the present invention will be described. The embodiments do not limit the invention according to the claims, and all the combinations of the features described in the embodiments are not necessarily essential to means provided by aspects of the invention. In addition, the embodiments are described with reference to the drawings. In the drawings, the same or similar portions are assigned the same reference numeral, and overlapping explanation may be occasionally omitted.

FIG. 1 schematically shows an example of an apparatus 100 including an electric storage system 110. With reference to FIG. 1, the configuration and operation of the apparatus 100 and the electric storage system 110 are explained. In the present embodiment, the apparatus 100 includes a motor 102 and an electric storage system 110. The apparatus 100 may be a transport apparatus such as an electric automobile, a hybrid automobile, an electric two wheeled vehicle, a rail vehicle, and an elevator. The apparatus 100 may be an electric appliance such as a personal computer and a portable telephone. The motor 102 is electrically connected to the electric storage system 110, and uses power supplied by the electric storage system 110. The motor 102 may be used as a regenerative brake. The motor 102 may be an example of an electric load.

The electric storage system 110 is electrically connected to the motor 102, to supply power to the motor 102 (occasionally referred to as "discharge of the electric storage system"). The electric storage system 110 is electrically connected to a charge apparatus not illustrated in the drawings, to store electric energy (occasionally referred to as "charge of the electric storage system").

The electric storage system 110 includes a terminal 112, a terminal 114, a protection circuit 116, and an electric storage module 120. The electric storage module 120 may include a plurality of electric storage cells and a plurality of balance correction circuits. The plurality of electric storage cells are serially connected and include an electric storage cell 122, an electric storage cell 124, an electric storage cell 126, and an electric storage cell 128. The plurality of balance correction circuits include a balance correction circuit 132, a balance correction circuit 134, and a balance correction circuit 136. The balance correction circuit 132, the balance correction circuit 134, and the balance correction circuit 136 may be an example of a balance correction apparatus.

In this specification, the term "electrically connected" is not limited to describe a concept that an element and another element are in direct connection. The term also includes a concept that an element and another element are connected with a third element therebetween. In addition, the term is not limited to describe such a concept that an element and another element are physically connected to each other. For example, an input coil and an output coil of a transformer, although not physically connected to each other, are electrically connected to each other. Furthermore, this term is not limited to describe such a concept that an element and another element are actually being electrically connected to each other; it can also be used to describe such a concept that an element and another element are brought into electrical connection to each other when the electric storage cell and the balance correction circuit are electrically connected to each other. The term "connected in series" indicates that an element and another element are electrically connected in series.

The terminal 112 and the terminal 114 electrically connect an apparatus (e.g., the motor 102, charge apparatus) outside the system, to an electric storage system 110. The protection circuit 116 protects the electric storage module 120 from at least one of excess current, excess voltage, and excess discharge. An example of the protection circuit 116 is a known excess current/excess voltage protection circuit such as disclosed in Japanese Patent Application Publication No. 2009-183141.

The electric storage cell 122, the electric storage cell 124, the electric storage cell 126, and the electric storage cell 128 are connected to each other in series. The electric storage cell 122, the electric storage cell 124, the electric storage cell 126, and the electric storage cell 128 may be a secondary battery or a capacitor. The electric storage cell 122, the electric storage cell 124, the electric storage cell 126, and the electric storage cell 128 may be a lithium ion battery. Each of the electric storage cell 122, the electric storage cell 124, the electric storage cell 126, and the electric storage cell 128 may further include a plurality of electric storage cells.

The balance correction circuit 132 equalizes the voltage between the electric storage cell 122 and the electric storage cell 124. The balance correction circuit 132 is electrically connected to an end of the electric storage cell 122 nearer the terminal 112 (occasionally referred to as "positive pole side"), as well as to a connection point 143 between an end of the electric storage cell 122 nearer the terminal 114 (occasionally referred to as "negative pole side") and the positive pole side of the electric storage cell 124. The balance correction circuit 132 is electrically connected to the a connection point 145 between the negative pole side of the electric storage cell 124 and the positive pole side of the electric storage cell 126.

Although not illustrated in the drawings, the balance correction circuit 132 may include an inductor electrically connected to the connection point 143. By electrically connecting the balance correction circuit 132, the electric storage cell 122, and the electric storage cell 124 as described above, a first circuit including the electric storage cell 122 and the inductor and a second circuit including the electric storage cell 124 and the inductor are formed. The balance correction circuit 132 runs current to the first circuit and the second circuit alternately. Accordingly, electric energy can be exchanged between the electric storage cell 122 and the electric storage cell 124 via the inductor. As a result, the voltage can be equalized between the electric storage cell 122 and the electric storage cell 124.

The balance correction circuit 134 equalizes the voltage between the electric storage cell 124 and the electric storage cell 126. The balance correction circuit 134 is electrically connected to the connection point 143, the connection point 145, and a connection point 147 between the negative pole side of the electric storage cell 126 and the positive pole side of the electric storage cell 128. The balance correction circuit 136 equalizes the voltage between the electric storage cell 126 and the electric storage cell 128. The balance correction circuit 136 is electrically connected to the connection point 145, the connection point 147, and the negative pole side of the electric storage cell 128. The balance correction circuit 134 and the balance correction circuit 136 may have a configuration similar to that of the balance correction circuit 132.

As stated above, according to the electric storage module 120 according to the present embodiment, even when there is variation caused between voltage of a plurality of electric storage cells, the balance correction circuit operates to equalize the voltage of the plurality of electric storage cells. As a result, the utilization efficiency of the electric storage system 110 can improve.

For example, when the electric storage cell 122 and the electric storage cell 124 have different manufacturing quality, deterioration degree or the like from each other, the electric storage cell 122 and the electric storage cell 124 may have different battery characteristics from each other. Some examples of the battery characteristics are battery capacity, and a discharge voltage characteristic that represents the relation between the battery voltage and the discharge time. For example, as an electric storage cell deteriorates, the battery voltage will drop within a shorter discharge time.

When the battery characteristics of the electric storage cell 122 and the electric storage cell 124 are different from each other, even though the voltage therebetween was substantially the same at the charge completion of the electric storage system 110, the electric storage cell 122 and the electric storage cell 124 will have voltage different from each other, as the electric storage system 110 discharges. In addition, even though the electric storage cell 122 and the electric storage cell 124 had substantially the same voltage at the beginning of charging the electric storage system 110, the voltage for the electric storage cell 122 and the electric storage cell 124 will differ from each other as the electric storage system 110 is charged.

The electric storage cell 122 and the electric storage cell 124 have a predetermined range of available charge level (occasionally referred to as "State of Charge: SOC"), and so if there is difference in voltage between the electric storage cell 122 and the electric storage cell 124, the utilization efficiency of the electric storage system 110 deteriorates. However, according to the electric storage module 120 of the present embodiment, the electric storage system 110 will have an improved utilization efficiency by equalizing the voltage between the electric storage cell 122 and the electric storage cell 124.

Figure 2:
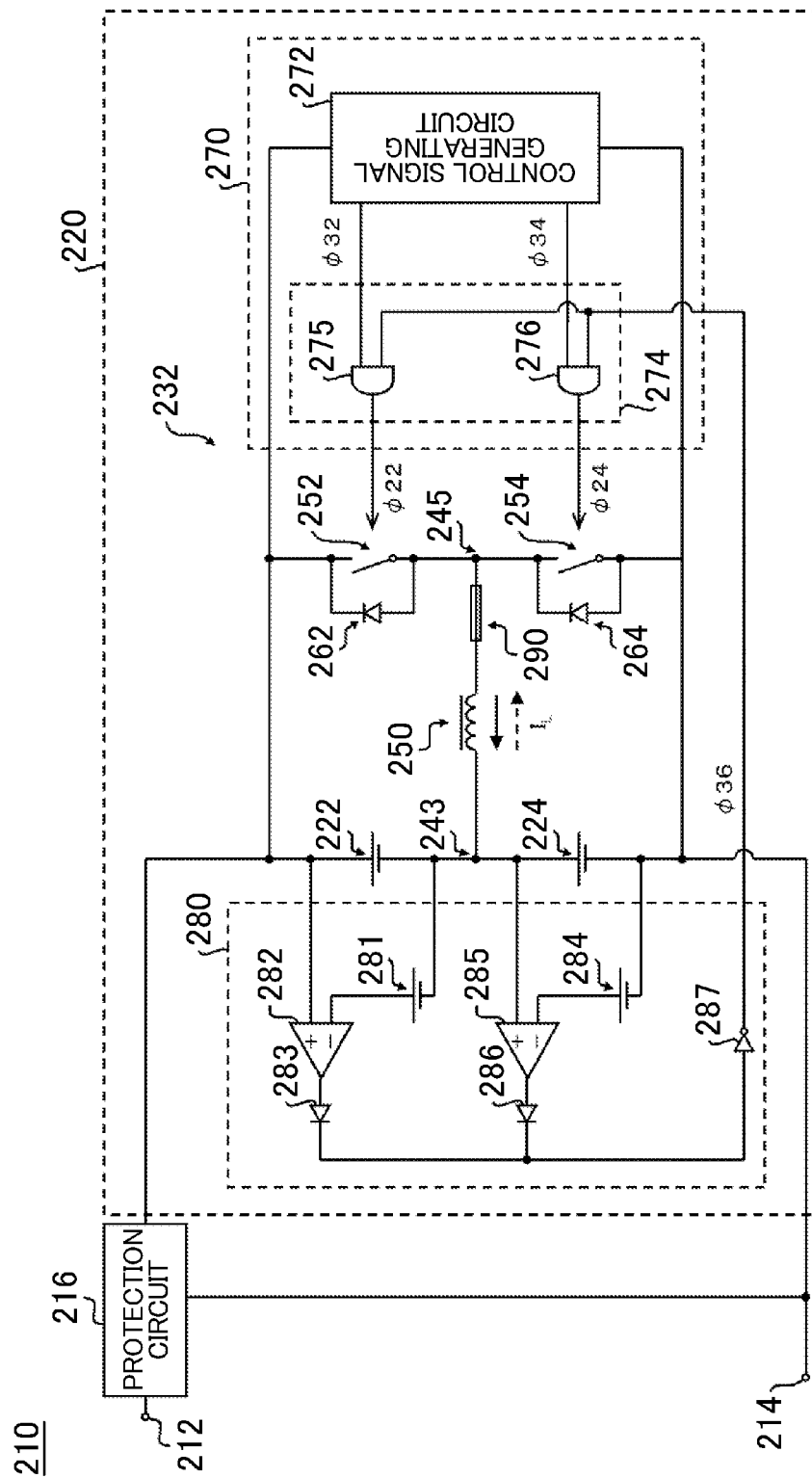
FIG. 2 schematically shows an example of an electric storage system 210.
Figure 3:
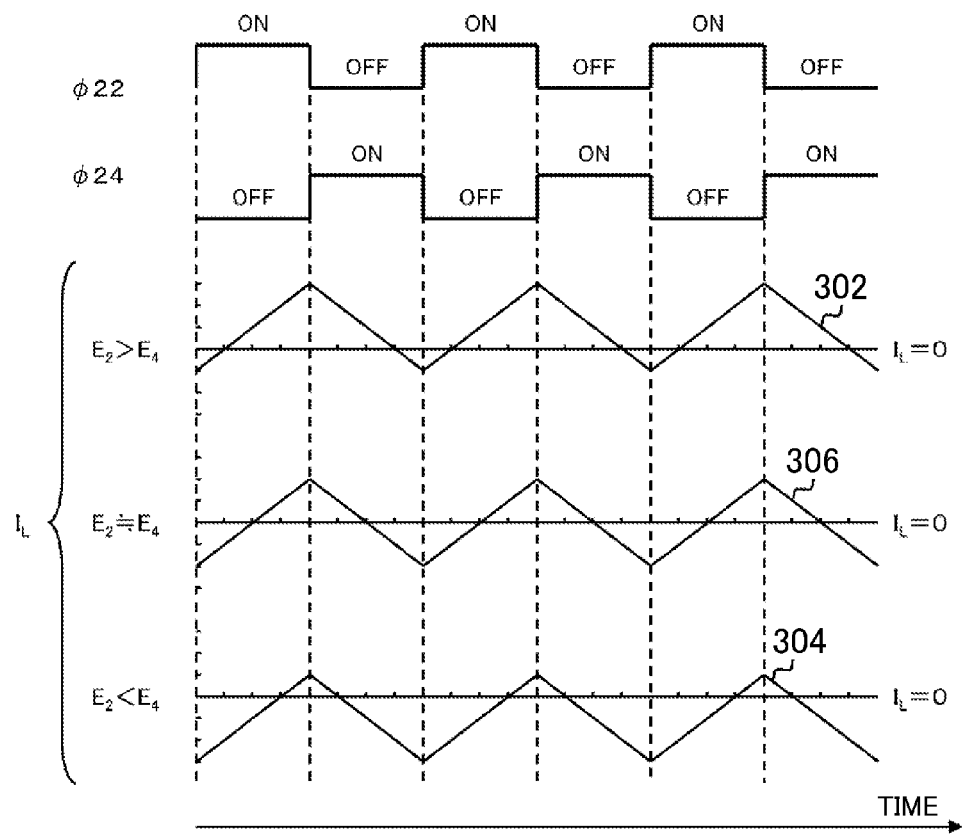
FIG. 3 schematically shows an example of an operation of the electric storage system 210.

FIG. 2 schematically shows an example of an electric storage system 210. FIG. 3 schematically shows an example of an operation of the electric storage system 210. The configuration and operation of the balance correction circuit are explained below with reference to FIG. 2 and FIG. 3. Note that the electric storage system shown in FIG. 2 and FIG. 3 has two electric storage cells, so as to simplify the explanation. However, those skilled in the art reading the description concerning the electric storage system 210 can configure and use an electric storage system having a plurality of electric storage cells and a plurality of balance correction circuits, just as in the case of the electric storage system 210.

In the present embodiment, the electric storage system 210 includes a terminal 212, a terminal 214, a protection circuit 216, and an electric storage module 220. The electric storage module 220 includes an electric storage cell 222 and an electric storage cell 224 connected in series, and a balance correction circuit 232 for equalizing the voltage of the electric storage cell 222 and the electric storage cell 224.

The balance correction circuit 232 may include an inductor 250, a switching device 252, a switching device 254, a diode 262, a diode 264, a control circuit 270, an excess voltage detecting circuit 280, and a fuse 290. The control circuit 270 may include a control signal generating circuit 272 and a stop signal generating circuit 274. The stop signal generating circuit 274 may include an AND circuit 275 and an AND circuit 276. The excess voltage detecting circuit 280 may include a reference voltage 281, an operational amplifier 282, a diode 283, a reference voltage 284, an operational amplifier 285, a diode 286, and a NOT circuit 287.

The electric storage cell 222 may be one example of a first electric storage cell. The electric storage cell 224 may be one example of a second electric storage cell. The balance correction circuit 232 may be one example of a balance correction apparatus. The switching device 252 may be one example of a first switching device. The switching device 254 may be one example of a second switching device. The control circuit 270 may be one example of a control section. The control signal generating circuit 272 may be one example of a control signal generating section. The stop signal generating circuit 274 may be one example of a stop signal generating section. The excess voltage detecting circuit 280 may be one example of an excess voltage detecting section. The value of the reference voltage 281 and the value of the reference voltage 284 may be one example of a predetermined value. The fuse 290 may be one example of a current restricting device.

The terminal 212 and the terminal 214 may have a configuration similar to that of the terminal 112 and that of the terminal 114, respectively. The protection circuit 216 may have a configuration similar to that of the protection circuit 116. The electric storage cell 222 and the electric storage cell 224 may have a configuration similar to that of the electric storage cell 122, the electric storage cell 124, the electric storage cell 126, or the electric storage cell 128. In the description of the electric storage system 210, the configuration similar to that of each element of the electric storage system 110 may be occasionally omitted. Also in FIG. 1, the electric storage system 110 may have a configuration similar to that of the electric storage system 210. The balance correction circuit 132, the balance correction circuit 134, and the balance correction circuit 136 may have a configuration similar to that of the balance correction circuit 232.

In the present embodiment, the balance correction circuit 232 is electrically connected to the positive pole side of the electric storage cell 222, to a connection point 243 between the negative pole side of the electric storage cell 222 and the positive pole side of the electric storage cell 224, and to the negative pole side of the electric storage cell 224. As a result, a first open/close circuit is formed, which includes the electric storage cell 222, the switching device 252, the fuse 290, and the inductor 250. In addition, a second open/close circuit is formed, which includes the electric storage cell 224, the inductor 250, the fuse 290, and the switching device 254. The connection point 243 may be an example of a connection point between an end of the first electric storage cell and an end of the second electric storage cell.

An end of the inductor 250 is electrically connected to the connection point 243. The other end of the inductor 250 may be electrically connected to a connection point 245 between the switching device 252 and the switching device 254. By alternating the ON operation and OFF operation (occasionally referred to as "ON/OFF operation") between the switching device 252 and the switching device 254, an inductor current $I_L$ will be generated in the inductor 250.

The switching device 252 is electrically connected between the other end of the inductor 250 and the positive pole side of the electric storage cell 222. The switching device 252 receives a control signal $\phi 22$ from the control circuit 270, and performs an ON operation or an OFF operation based on this control signal $\phi 22$. This opens or closes the first open/close circuit. The switching device 252 may be a MOSFET.

The switching device 254 is electrically connected between the other end of the inductor 250 and the negative pole side of the electric storage cell 224. The switching device 254 receives a control signal $\phi 24$ from the control circuit 270, and performs an ON operation or an OFF operation based on this control signal $\phi 24$. This opens or closes the second open/close circuit. The switching device 254 may be a MOSFET.

The diode 262 is formed in parallel with the switching device 252, and runs a current from the other end of the inductor 250 towards the positive pole side of the electric storage cell 222. The diode 264 is formed in parallel with the switching device 254, and runs a current from the negative pole side of the electric storage cell 224 towards the other end of the inductor 250. The diode 262 and the diode 264 may be a parasitic diode formed equivalently between the source and the drain of the MOSFET.

By providing the diode 262 and the diode 264, even in a case in which the inductor current $I_L$ remains during a period in which both of the switching device 252 and the switching device 254 are brought to the OFF state, the inductor current $I_L$ can continue running through the diode 262 and the diode 264. This improves the utilization rate of the inductor current $I_L$ generated in the inductor 250. This can also prevent surge voltage from occurring, which would occur when the inductor current $I_L$ is interrupted.

The control circuit 270 supplies a control signal $\phi 22$ for controlling ON/OFF operation of the switching device 252, to the switching device 252. The control circuit 270 supplies a control signal $\phi 24$ for controlling ON/OFF operation of the switching device 254, to the switching device 254.

In the present embodiment, the control signal generating circuit 272 generates a control signal $\phi 32$ used for control of the ON/OFF operation of the switching device 252, and a control signal $\phi 34$ used for control of the ON/OFF operation of the switching device 254. The control signal generating circuit 272 may generate the control signals $\phi 32$ and $\phi 34$, so that, when supplied to the switching device 252 and the switching device 254, the switching device 252 and the switching device 254 repeat the ON/OFF operations alternately. The control signal generating circuit 272 supplies the control signals $\phi 32$ and $\phi 34$ to the stop signal generating circuit 274.

The control signal generating circuit 272 may be a pulse generator generating pulse arrays having a predetermined period. The control signal generating circuit 272 may be a variable pulse generator performing variable control of a duty ratio of at least one of the control signals $\phi 32$ and $\phi 34$. The duty ratio can be calculated as a ratio of ON period to a period of a square wave. Each of the control signals $\phi 32$ and $\phi 34$ may be a square wave having a duty ratio of 50%. The control signal generating circuit 272 may be formed on a same substrate on which the switching device 252 and the switching device 254 are formed.

In the present embodiment, the stop signal generating circuit 274 receives control signals $\phi 32$ and $\phi 34$ from the control signal generating circuit 272. In addition, the stop signal generating circuit 274 receives a control signal $\phi 36$ from the excess voltage detecting circuit 280. The control signal $\phi 36$ represents information related to a voltage of the electric storage cell 222 and a voltage of the electric storage cell 224. The control signal $\phi 36$ may be a signal representing whether at least one of the voltage of the electric storage cell 222 and the voltage of the electric storage cell 224 is equal to a predetermined value or larger than the predetermined value.

In the present embodiment, the stop signal generating circuit 274 generates a control signal $\phi 22$, based on the control signals $\phi 32$ and $\phi 36$. In addition, the stop signal generating circuit 274 generates a control signal $\phi 24$, based on the control signals $\phi 34$ and $\phi 36$. The stop signal generating circuit 274 may be formed on a same substrate on which the switching device 252 and the switching device 254 are formed.

When the voltage of the electric storage cell 222 and the voltage of the electric storage cell 224 are smaller than a predetermined value, the stop signal generating circuit 274 may supply the control signals $\phi 32$ and $\phi 34$ to the switching device 252 and the switching device 254, as the control signals $\phi 22$ and $\phi 24$. Accordingly, when the voltage of the electric storage cell 222 and the voltage of the electric storage cell 224 are smaller than a predetermined value, the control circuit 270 can supply the control signals $\phi 22$ and $\phi 24$ so that the switching device 252 and the switching device 254 can repeat ON/OFF operations alternately.

When at least one of the voltage of the electric storage cell 222 and the voltage of the electric storage cell 224 is equal to a predetermined value or larger than a predetermined value, the stop signal generating circuit 274 may generate such control signals φ22 and φ24 as stopping the balance correction circuit 232, and supply them to the switching device 252 and the switching device 254. For example, when the voltages of the electric storage cell 222 and the electric storage cell 224 are within a range of normal values, the stop signal generating circuit 274 supplies the control signals φ32 and φ34 as control signals φ22 and φ24. When the excess voltage detecting circuit 280 has detected that at least one of the voltages of the electric storage cell 222 and the electric storage cell 224 is equal to a predetermined value or larger than a predetermined value, the stop signal generating circuit 274 generates such control signals φ22 and φ24 as stopping the balance correction circuit 232.

Accordingly, when at least one of the voltages of the electric storage cell 222 and the electric storage cell 224 is equal to a predetermined value or larger than a predetermined value, the control circuit 270 can supply the control signals φ22 and φ24 so as to stop the balance correction circuit 232. For example, the control signals φ22 and φ24 may be supplied so that both of the switching device 252 and the switching device 254 operate to be OFF, to stop the balance correction circuit 232.

The excess voltage detecting circuit 280 detects that at least one of the voltage of the electric storage cell 222 and the voltage of the electric storage cell 224 is equal to a predetermined value or larger than a predetermined value. The excess voltage detecting circuit 280 may generate a control signal φ36 based on the voltage of the electric storage cell 222 and the voltage of the electric storage cell 224, and supply it to the stop signal generating circuit 274. The excess voltage detecting circuit 280 may be formed on a same substrate on which the switching device 252 and the switching device 254 are formed.

In the present embodiment, an operation of the control signal generating circuit 272, the stop signal generating circuit 274, and the excess voltage detecting circuit 280 is explained taking an example in which, when at least one of the voltages of the electric storage cell 222 and the electric storage cell 224 is larger than a predetermined value, the control circuit 270 supplies the control signals φ22 and φ24 so that both of the switching device 252 and the switching device 254 operate to be OFF.

In the present embodiment, the switching device 252 operates to be ON when the control signal φ22 is H logic, and operates to be OFF when the control signal φ22 is L logic. In addition, the switching device 254 operates to be ON when the control signal φ24 is H logic, and operates to be OFF when the control signal φ24 is L logic. In the present embodiment, when the control signal φ36 is H logic, it indicates that the voltage of the electric storage cell 222 and the voltage of the electric storage cell 224 are equal to or below a predetermined value, and when the control signal φ36 is L logic, it indicates that at least one of the voltage of the electric storage cell 222 and the voltage of the electric storage cell 224 is larger than a predetermined value.

It should be noted that the control circuit 270 can supply the control signals φ22 and φ24 according to an arbitrary configuration. It should be also noted that the configurations of the switching device 252, the switching device 254, the control signal generating circuit 272, the stop signal generating circuit 274, and the excess voltage detecting circuit 280 are not limited to as described above.

In the present embodiment, the voltage at the positive polarity side of the electric storage cell 222 is inputted to the non-inverted input terminal of the operational amplifier 282, whereas the reference voltage 281 is inputted to the inverted input terminal of the operational amplifier 282. The reference voltage 281 is electrically connected to the negative polarity side of the electric storage cell 222. When the voltage of the electric storage cell 222 is larger than the reference voltage 281, the output of the operational amplifier 282 is inputted to the NOT circuit 287 via the diode 283. Accordingly, the excess voltage detecting circuit 280 outputs the control signal φ36 of L logic when the voltage of the electric storage cell 222 is larger than the reference voltage 281.

The voltage at the positive polarity side of the electric storage cell 224 is inputted to the non-inverted input terminal of the operational amplifier 285, whereas the reference voltage 284 is inputted to the inverted input terminal of the operational amplifier 285. The reference voltage 284 is electrically connected to the negative polarity side of the electric storage cell 224. When the voltage of the electric storage cell 224 is larger than the reference voltage 284, the output of the operational amplifier 285 is inputted to the NOT circuit 287 via the diode 286. Accordingly, the excess voltage detecting circuit 280 outputs the control signal φ36 of L logic when the voltage of the electric storage cell 224 is larger than the reference voltage 281.

The control signals φ32 and φ36 are inputted to the AND circuit 275. When both are H logic, the stop signal generating circuit 274 outputs the control signal φ22 of H logic. Accordingly, the switching device 252 is operated to be ON. On the other hand, when at least one of the control signals φ32 and φ36 is L logic, the stop signal generating circuit 274 outputs the control signal φ22 of L logic. Accordingly, the switching device 252 is operated to be OFF.

The control signals φ34 and φ36 are inputted to the AND circuit 276. When both are H logic, the stop signal generating circuit 274 outputs the control signal φ24 of H logic. Accordingly, the switching device 254 is operated to be ON. On the other hand, when at least one of the control signals φ34 and φ36 is L logic, the stop signal generating circuit 274 outputs the control signal φ24 of L logic. Accordingly, the switching device 254 is operated to be OFF.

According to the present embodiment, when at least one of the voltage of the electric storage cell 222 and the voltage of the electric storage cell 224 is larger than a predetermined value, the balance correction circuit 232 can be stopped. Accordingly, even when the control signal generating circuit 272 is malfunctioning, it becomes possible to restrain application of excess voltage to the electric storage cell 222 and the electric storage cell 224. This is particularly effective when the balance correction circuit 232 is electrically connected to the electric storage cell 222 and the electric storage cell 224 at a position closer to the electric storage cell 222 and the electric storage cell 224 than to the protection circuit 216 protecting the electric storage module 220.

The control signal generating circuit 272 and the excess voltage detecting circuit 280 may be formed on a same substrate on which at least one of the switching device 252 and the switching device 254 is formed. In this case, the distance between at least one of the switching device 252 and the switching device 254 and the control signal generating circuit 272 may be shorter than the distance between at least one of the switching device 252 and the switching device 254 and the excess voltage detecting circuit 280.

In particular, the minimum value of the distance between at least one of the switching device 252 and the switching device 254 and the control signal generating circuit 272 may be smaller than the minimum value of the distance between at least one of the switching device 252 and the switching device 254 and the excess voltage detecting circuit 280. The control signal generating circuit 272 and the excess voltage detecting circuit 280 may be provided on the substrate, so as to sandwich at least one of the switching device 252 and the switching device 254.

By doing so, the simultaneous failure of the control signal generating circuit 272 and the excess voltage detecting circuit 280 can be restrained. For example, by adding switching operation, static electricity, lighting surge of the switching device 252 and the switching device 254, simultaneous failure of the control signal generating circuit 272 and the excess voltage detecting circuit 280 can be restrained.

The fuse 290 is connected in series with the inductor 250. In the present embodiment, an end of the fuse 290 is electrically connected to the other end of the inductor 250. The other end of the fuse 290 is electrically connected to connection point 245 between the switching device 252 and the switching device 254. The fuse 290 restricts the current from running to the inductor 250 once the magnitude of the current flowing through the inductor 250 has exceeded a predetermined value. The fuse 290 may be an overcurrent circuit breaker type fuse or a temperature fuse.

By the arrangement of connecting the fuse 290 in series with the inductor 250, excess current is prevented from running in at least one of the electric storage cell 222 and the electric storage cell 224 even in such a case in which there is failure in at least one of the switching device 252, the switching device 254, and the control signal generating circuit 272 thereby keeping closed at least one of the switching device 252 and the switching device 254.

In addition, when the switching device 252 and the switching device 254 are operated to be OFF so that the control circuit 270 can stop the balance correction circuit 232, there may be such cases in which at least one of the switching device 252, the switching device 254, and the control signal generating circuit 272 is failed, to prevent OFF operation of at least one of the switching device 252 and the switching device 254. Even in such cases, the fuse 290 is connected in series to the inductor 250, and therefore, any operable one of the switching device 252 and the switching device 254 can be operated to be ON, so as to enable the balance correction circuit 232 to be stopped. Accordingly, the electric storage cell 222 and the electric storage cell 224 can be protected from excess voltage.

The present embodiment has explained an example in which, when at least one of the voltage of the electric storage cell 222 and the voltage of the electric storage cell 224 is equal to a predetermined value, the control circuit 270 supplies the control signals $\phi22$ and $\phi24$ so that the switching device 252 and the switching device 254 repeat ON/OFF operations alternately. However, the control circuit 270 may supply the control signals $\phi22$ and $\phi24$ to stop the balance correction circuit 232, when at least one of the voltage of the electric storage cell 222 and the voltage of the electric storage cell 224 is equal to a predetermined value.

The present embodiment has explained an example in which the balance correction circuit 232 is stopped by the control circuit 270 supplying the control signals $\phi22$ and $\phi24$ so that both of the switching device 252 and the switching device 254 are operated to be OFF. However, the method to supply the control signals $\phi22$ and $\phi24$ to stop the balance correction circuit 232 is not limited to this.

The control circuit 270 may stop the balance correction circuit 232 by supplying the control signal $\phi22$ or $\phi24$ to any operable one of the switching device 252 and the switching device 254 to operate the switching device to be ON. In the present embodiment, when one of the switching device 252 and the switching device 254 is operated to be ON, excess current runs through the first open/close circuit and the second open/close circuit, to meltdown the fuse 290. As a result, the balance correction circuit 232 can be stopped.

The present embodiment has dealt with an example in which the fuse 290 is provided between the other end of the inductor 250 and the connection point 245. However, the number of the fuses 290 as well as the position at which the fuse(s) 290 is (are) provided are not limited to as described. In fact, the fuse 290 may be connected in series with the inductor 250 in any position between the connection point 243 and an end of the inductor 250. According to this arrangement, it becomes possible to protect both of the electric storage cell 222 and the electric storage cell 224 by a single fuse. The balance correction circuit 232 can include one or more fuses in each of the first open/close circuit and the second open/close circuit.

In the present embodiment, the fuse was an example of the current restricting device. However, the current restricting device is not limited to a fuse. In fact, the current restricting device may be a PTC thermistor which builds up an internal resistance in response to the temperature increase. The current restricting device may also be an electric current breaker.

Next, with reference to FIG. 3, the operation of the electric storage system 210 is explained. FIG. 3 shows an example of a normal operation of the electric storage system 210. FIG. 3 shows a graph 302, a graph 304, and a graph 306, in correspondence with an example of a waveform of the control signal $\phi22$ and $\phi24$. The graph 302, the graph 304, and the graph 306 have a horizontal axis representing an elapse of time. The longitudinal axis thereof represents the magnitude of the inductor current $I_L$. The magnitude of the inductor current $I_L$ in FIG. 3 assumes that the current running in the direction from the connection point 245 towards the connection point 243 is positive (represented by the solid arrow in FIG. 2).

The graph 302 schematically shows an exemplary chronological change of the inductor current $I_L$ when the voltage $E_2$ of the electric storage cell 222 is larger than the voltage $E_4$ of the electric storage cell 224. The graph 304 schematically shows an exemplary chronological change of the inductor current $I_L$ when the voltage $E_2$ of the electric storage cell 222 is smaller than the voltage $E_4$ of the electric storage cell 224. The graph 306 schematically shows an exemplary chronological change of the inductor current $I_L$ when the voltage $E_2$ of the electric storage cell 222 is substantially the same as the voltage $E_4$ of the electric storage cell 224.

In FIG. 3, the control signals $\phi22$ and $\phi24$ in FIG. 3 each are a square wave having a duty ratio of 50%, so as to simplify the explanation. As shown in FIG. 3, the control signals $\phi22$ and $\phi24$ have logics or phase polarities complementary to each other so that one of the switching device 252 and the switching device 254 can be OFF while the other is ON.

As shown in FIG. 3, in the present embodiment, the switching device 252 is operated to be ON when the control signal $\phi22$ is H logic, and is operated to be OFF when the control signal $\phi22$ is L logic. The switching device 254 is operated to be ON when the control signal $\phi24$ is H logic, and is operated to be OFF when the control signal $\phi24$ is L logic.

As shown in the graph 302, when the voltage $E_2$ of the electric storage cell 222 is larger than the voltage $E_4$ of the electric storage cell 224, and when the switching device 252 is ON, the current runs along the current path from the positive polarity side of the electric storage cell 222, the switching device 252, the connection point 245, the fuse 290, the inductor 250, the connection point 243, to the negative polarity side of the electric storage cell 222. In this example, the inductor 250 is charged with the inductor current $I_L$ in the direction shown by the solid arrow in FIG. 2.

Subsequently, the switching device 252 is brought to the OFF state, and the switching device 254 is brought to the ON state. Then, the inductor current $I_L$ charged in the inductor 250 is discharged along the current path from one end of the inductor 250, the connection point 243, the electric storage cell 224, the switching device 254, the connection point 245, the fuse 290, to the inductor 250. This discharge is performed while charging the electric storage cell 224. As shown in FIG. 3, the inductor current $I_L$ decreases due to discharge as time goes by, and when the discharge current becomes 0, the inductor 250 will have flowing therein a charge current that is in a direction reverse to the discharge current.

As the graph 304 shows, when the voltage $E_2$ of the electric storage cell 222 is smaller than the voltage $E_4$ of the electric storage cell 224, and when the switching device 254 is ON, the current runs along the current path from the positive polarity side of the electric storage cell 224, the connection point 243, the inductor 250, the fuse 290, the connection point 245, the switching device 254, to the negative polarity side of the electric storage cell 224. In this example, the inductor 250 is charged with the inductor current $I_L$ in the direction shown by the dotted arrow in FIG. 2.

Subsequently, the switching device 254 is brought to the OFF state, and the switching device 252 is brought to the ON state. Then, the inductor current $I_L$ charged in the inductor 250 is discharged along the current path from the other end of the inductor 250, the fuse 290, the connection point 245, the switching device 252, the electric storage cell 222, the connection point 243, to the one end of the inductor 250. This discharge is performed while charging the electric storage cell 222.

As the graph 306 shows, when the voltage $E_2$ of the electric storage cell 222 is substantially the same as the voltage $E_4$ of the electric storage cell 224, during the period in which the switching device 252 or the switching device 254 is ON, discharge and charge of the inductor current $I_L$ is pursued substantially in the equal amount. As a result, the voltage can be maintained substantially balanced.

As stated above, by the balance correction circuit 232 causing a current to flow to the first open/close circuit and the second open/close circuit alternately, electric energy can be exchanged between the electric storage cell 222 and the electric storage cell 224 via the inductor 250. As a result, the voltages of the electric storage cell 222 and the electric storage cell 224 can be equalized.

When there is a failure in the control signal generating circuit 272, to prevent normal control of the duty ratio of the control signals φ22 and φ24, it becomes difficult to control the amount of discharge and the amount of charge. However, even when normal control of the duty ratio of the control signals φ22 and φ24 is prevented, it is desirable to prevent application of excess voltage to at least one of the electric storage cell 222 and the electric storage cell 224.

According to the present embodiment, when at least one of the voltages of the electric storage cell 222 and the electric storage cell 224 is equal to a predetermined value or larger than a predetermined value, the control signals φ22 and φ24 are supplied so that both of the switching device 252 and the switching device 254 are operated to be OFF, for example. Accordingly, the balance correction circuit 232 can be stopped.

In addition, when at least one of the voltage of the electric storage cell 222 and the voltage of the electric storage cell 224 is equal to a predetermined value or larger than a predetermined value even when the control signals φ22 and φ24 are supplied so that both of the switching device 252 and the switching device 254 are operated to be OFF, the control signal φ22 or φ24 is supplied to any operable one of the switching device 252 and 254 so that the switching device can be operated to be ON. Accordingly, even when it is impossible to operate to be OFF at least one of the switching device 252 and the switching device 254 for any reason, the balance correction circuit 232 can still be stopped.

The present embodiment is based on the assumption that control signals φ22 and φ24 have a duty ratio of 50%, for making explanation simple. However, the control signals φ22 and φ24 are not limited to this configuration. In fact, the duty ratio of the control signals φ22 and φ24 can be changed according to the difference in voltage between the electric storage cell 222 and the electric storage cell 224.

In the present embodiment, an example is explained in which the switching device 252 and the switching device 254 repeat ON/OFF operations alternately, by the control circuit 270 supplying the control signals φ22 and φ24 to repeat, at a predetermined period, a switching operation including a first operation and a second operation. Here, in the first operation, one of the switching device 252 and the switching device 254 is operated to be ON, and the other switching device is operated to be OFF, whereas in the second operation, the one of the switching device 252 and the switching device 254 is operated to be OFF, and the other switching device is operated to be ON.

However, the operation of the control circuit 270 is not limited to this. It is also possible that the switching device 252 and the switching device 254 repeat ON/OFF operations alternately, by the control circuit 270 supplying the control signals φ22 and φ24 to repeat, at a predetermined period, a switching operation including the above-explained first operation, the above-explained second operation, and a third operation. In the third operation, both of the switching device 252 and the switching device 254 are operated to be OFF.

In the present embodiment, even when the voltage $E_2$ of the electric storage cell 222 and the voltage $E_4$ of the electric storage cell 224 are substantially the same, the control circuit 270 supplies the control signals φ22 and φ24 to allow the balance correction circuit 232 to continue the balance correction operation. However, the operation of the control circuit 270 is not limited to this. When the voltage difference between the voltage $E_2$ of the electric storage cell 222 and the voltage $E_4$ of the electric storage cell 224 becomes smaller than a predetermined value, the control circuit 270 may supply the control signals φ22 and φ24 to cause the balance correction circuit 232 to stop the balance correction operation.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION Of REFERENCE NUMERALS 100 apparatus
102 motor
110 electric storage system
112 terminal 114 terminal
116 protection circuit
120 electric storage module
122 electric storage cell
124 electric storage cell
126 electric storage cell
128 electric storage cell
132 balance correction circuit
134 balance correction circuit
136 balance correction circuit
143 connection point
145 connection point
147 connection point
210 electric storage system
212 terminal
214 terminal
216 protection circuit
220 electric storage module
222 electric storage cell
224 electric storage cell
232 balance correction circuit
243 connection point
245 connection point
250 inductor
252 switching device
254 switching device
262 diode
264 diode
270 control circuit
272 control signal generating circuit
274 stop signal generating circuit
275 AND circuit
276 AND circuit
280 excess voltage detecting circuit
281 reference voltage
282 operational amplifier
283 diode
284 reference voltage
285 operational amplifier
286 diode
287 NOT circuit
290 fuse
302 graph
304 graph
306 graph

What is claimed is:

1. A balance correction apparatus that equalizes voltages of a first electric storage cell and a second electric storage cell connected in series, comprising:
    an inductor having an end electrically connected to a connection point between an end of the first electric storage cell and an end of the second electric storage cell;
    a first switching device electrically connected between another end of the inductor and another end of the first electric storage cell;
    a second switching device electrically connected between the other end of the inductor and another end of the second electric storage cell; and
    a control section supplying a control signal to control ON/OFF operations of the first switching device and the second switching device, to the first switching device and the second switching device, wherein
    the control section supplies the control signal so that the first switching device and the second switching device repeat ON/OFF operations alternately when a voltage of the first electric storage cell and a voltage of the second electric storage cell are lower than a predetermined value, and
    the control section supplies the control signal to stop the balance correction apparatus, when at least one of the voltage of the first electric storage cell and the voltage of the second electric storage cell is equal to the predetermined value or larger than the predetermined value.

2. The balance correction apparatus according to claim 1, further comprising
    an excess voltage detecting section detecting that at least one of the voltage of the first electric storage cell and the voltage of the second electric storage cell is equal to the predetermined value or higher than the predetermined value, wherein
    the control section includes:
    a control signal generating section that generates the control signal so that the first switching device and the second switching device repeat ON/OFF operations alternately; and
    a stop signal generating section that generates the control signal so as to stop the balance correction apparatus when the excess voltage detecting section has detected that at least one of the voltage of the first electric storage cell and the voltage of the second electric storage cell is equal to the predetermined value or larger than the predetermined value.

3. The balance correction apparatus according to claim 2, wherein
    the first switching device, the excess voltage detecting section, and the control signal generating section are formed on a same substrate, and
    a distance between the first switching device and the control signal generating section is shorter than a distance between the first switching device and the excess voltage detecting section.

4. An electric storage system comprising:
    a first electric storage cell and a second electric storage cell connected in series; and
    the balance correction apparatus according to claim 3, equalizing voltages of the first electric storage cell and the second electric storage cell.

5. An electric storage system comprising:
    a first electric storage cell and a second electric storage cell connected in series; and
    the balance correction apparatus according to claim 2, equalizing voltages of the first electric storage cell and the second electric storage cell.

6. The balance correction apparatus according to claim 1, wherein
    the control section supplies the control signal to cause both of the first switching device and the second switching device to be operated to be OFF, when at least one of the voltage of the first electric storage cell and the voltage of the second electric storage cell is equal to the predetermined value or larger than the predetermined value.

7. An electric storage system comprising:
    a first electric storage cell and a second electric storage cell connected in series; and
    the balance correction apparatus according to claim 6, equalizing voltages of the first electric storage cell and the second electric storage cell.

8. The balance correction apparatus according to claim 1, further comprising
    a current restricting device restricting a current flowing to the inductor when a magnitude of a current flowing through the inductor has exceeded a predetermined value, wherein
    the control section supplies the control signal to cause an any operable one of the first switching device and the second switching device is operated to be ON, when at least one of the voltage of the first electric storage cell and the voltage of the second electric storage cell is equal to the predetermined value or larger than the predetermined value.

9. An electric storage system comprising:

a first electric storage cell and a second electric storage cell connected in series; and the balance correction apparatus according to claim 8, equalizing voltages of the first electric storage cell and the second electric storage cell.

10. An electric storage system comprising:

a first electric storage cell and a second electric storage cell connected in series; and the balance correction apparatus according to claim 1, equalizing voltages of the first electric storage cell and the second electric storage cell.

* * * * *